Jan. 9, 1923.

J. J. KREJCI.
WRIST PIN.
FILED NOV. 4, 1921.

1,441,729.

INVENTOR.
JOHN J. KREJCI
BY
Shigley & Harney
ATTORNEYS

Patented Jan. 9, 1923.

1,441,729

UNITED STATES PATENT OFFICE.

JOHN J. KREJCI, OF COLUMBUS, OHIO.

WRIST PIN.

Application filed November 4, 1921. Serial No. 512,851.

*To all whom it may concern:*

Be it known that I, JOHN J. KREJCI, a citizen of the United States of America, residing at Columbus, in the county of Franklin and State of Ohio, have invented certain new and useful Improvements in Wrist Pins, of which the following is a specification.

My present invention relates generally to the cylinders and pistons of internal combustion engines, air compressors, pumps, riveters, and in fact all machinery wherein a cylinder, a piston and a connecting rod or the piston are parts, and more especially my invention relates to the means of attaching the connecting rods with the pistons.

This is accomplished at present by wrist pins having square ends which on endwise displacement are in great source of danger in so far as scoring of the cylinder walls is concerned and my invention has for its object an improved form of wrist pin which in the event of endwise displacement will avoid injury to the cylinder wall along which the piston works.

In carrying out my invention I propose a wrist pin which will avoid internal scoring of cylinders through both the shape and character of the pin as I will hereinafter describe with respect to the accompanying drawing, forming a part of this specification, and wherein—

Figure 1:
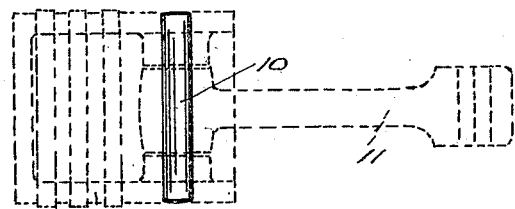
Figure 1 is a side view illustrating the practical use of the invention.
Figure 2:
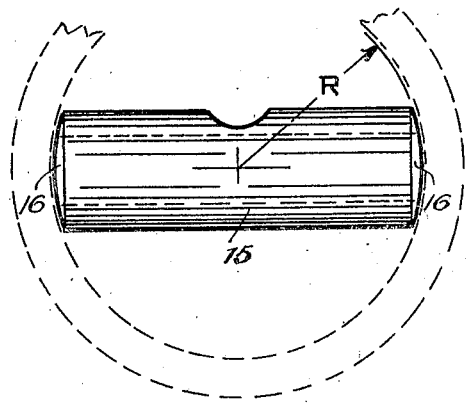
Figure 2 is a plan view of the wrist pin as proposed by my invention.
Figure 4:
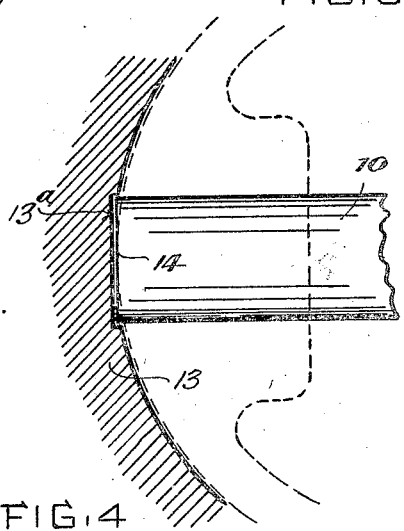
Figure 4 is a sectional plan view illustrating the usual form of wrist pin.

Referring now to these figures and particularly to Figures 1 and 4, a wrist pin 10 is the ordinary means of connection between a connecting rod 11 and a piston 12 the latter of which is adapted to work in a cylinder 13, the wrist pin ordinarily being squarely cut at its ends as indicated at 14 in Figure 4 so that in the event of lengthwise displacement of the wrist pin caused by wear, these square ends are sources of possible and in fact probable internal scoring of the cylinder 13 as indicated at 13ª in Figure 4.

In order to avoid this disadvantage and objection I propose a wrist pin 15 whose opposite ends are formed with convex end faces 16, curved in the same degree as the cylinder wall, that is on a radius the same as that of the cylinder wall. This curvature is carried in all directions so that rotation of the wrist pin has no adverse effect upon the efficiency of the construction.

Figure 3:
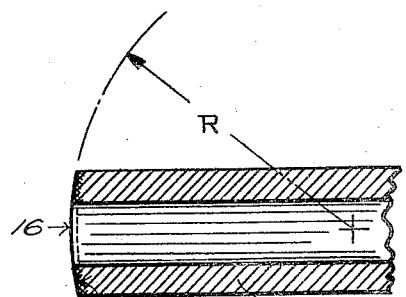
Figure 3 is a partial longitudinal section therethrough.

I moreover propose that the said ends 16 of the wrist pin be softened in order to offset the danger of scoring, by either annealing the ends of the wrist pin or attaching to the ends as by means of welding or otherwise curved disks or sections of a softer material than that of which the wrist pin is formed. This is plainly to be seen at 17 in Figure 3, and the invention as thus outlined will be found highly efficient in the prevention of cylinder scoring by endwise displacement of the wrist pins which so often occurs during wear of the parts.

I claim:

1. A wrist pin for cylinder traversing pistons having softened ends to avoid scoring of a cylinder upon endwise displacement of the wrist pin.

2. A wrist pin for cylinder traversing pistons, having softened ends to avoid cylinder scoring upon endwise displacement of the pin in use, said softened ends being curved to conform to the curvature of a cylinder wall.

In testimony whereof I have affixed my signature.

JOHN J. KREJCI.